United States Patent [19]

Förner et al.

[11] Patent Number: 4,657,450
[45] Date of Patent: Apr. 14, 1987

[54] MACHINING TOOL FOR PIPES

[75] Inventors: Siegfried Förner, Erlangen; Georg Gebald, Kirchehrenbach, both of Fed. Rep. of Germany

[73] Assignee: Kraftwerk Union Aktiengesellschaft, Mülheim, Fed. Rep. of Germany

[21] Appl. No.: 840,936

[22] Filed: Mar. 18, 1986

[30] Foreign Application Priority Data

Mar. 19, 1985 [DE] Fed. Rep. of Germany ....... 3510288

[51] Int. Cl.⁴ .......................... B23C 3/00; B24B 5/40
[52] U.S. Cl. .................... 409/143; 51/241 R; 51/245
[58] Field of Search .................. 29/33.7; 409/143; 51/241 R, 245; 414/728, 729, 751; 358/100; 175/78

[56] References Cited

U.S. PATENT DOCUMENTS

| | | | |
|---|---|---|---|
| 1,365,149 | 1/1921 | Breed | 51/245 |
| 2,931,146 | 4/1960 | Handwerk et al. | 51/241 R |
| 4,084,484 | 4/1978 | Shklyanov et al. | 409/143 X |
| 4,197,908 | 4/1980 | Davis et al. | 175/78 X |
| 4,327,526 | 5/1982 | Petyjohn et al. | 409/143 |
| 4,383,395 | 5/1983 | Wilger et al. | 409/143 X |
| 4,442,891 | 4/1984 | Wood | 409/143 |
| 4,460,920 | 7/1984 | Weber et al. | 414/728 |
| 4,577,388 | 3/1986 | Wood | 409/143 |

FOREIGN PATENT DOCUMENTS

| | | | |
|---|---|---|---|
| 60-819 | 5/1985 | Japan | 409/143 |
| 698726 | 12/1979 | U.S.S.R. | 409/143 |
| 854610 | 8/1981 | U.S.S.R. | 409/143 |

Primary Examiner—William R. Briggs
Attorney, Agent, or Firm—Herbert L. Lerner; Laurence A. Greenberg

[57] ABSTRACT

A manipulator head for the remotely controlled positioning and operation of a tool in the interior of a pipe includes:

first support flanges having guiding elements and clamping devices;

a tubular tool holder frame having second support flanges interconnecting the first support flanges and being rotatably supported thereby;

a rotating tool including a milling cutter at an assembly opening in the tool holder for machining the inner wall surface of a pipe;

a first guide rail attached to the inner wall surface of the tool holder, a first slide axially movable on the first guide rail, a first driving device coupled to the first slide for axially moving the tool;

a second guide rail fastened to the first slide, a second slide radially movable on the second guide rail, a second driving device coupled to the second slide for radially setting the tool;

the milling cutter being fastened to the second slide, a third driving device coupled to the milling cutter for a working motion of the tool; and a fourth driving device disposed at one of the first support flanges for rotating the tool holder relative thereto including a worm gear transmission having a worm gear fastened on the outer surface of one of the first support flanges, and a worm, a step-down transmission and a drive motor transverse to the axis of the manipulator head; and pillow blocks supporting the drive motor and the step-down transmission.

5 Claims, 6 Drawing Figures

MACHINING TOOL FOR PIPES

The invention relates to the servicing of pipeline installations and can be used in the mechanical construction of a manipulator head which can be positioned by remote control, alone or together with a manipulator vehicle (stepping mechanism or motor-driven drive wheels) in the interior of a pipe or a pipeline and is equipped with a tool for machining the inner surface of the pipe or the pipeline.

A conventional manipulator head of this type is coupled to a stepping mechanism and is essentially formed of two support flanges which are equipped with radially disposed guide elements for the rolling advancement of the manipulator head, a tool holder which axially interconnects the two support flanges and is rotatably supported in the support flanges, and a rotating tool (grinding wheel) which is movably fastened to the tool holder, for the mechanical machining of the inner wall surface of the pipe or the pipeline. A first driving device for the axial movement of the tool, a second driving device for the radial setting of the tool and a third driving device for the working motion of the tool, are disposed on the tool holder in such a device. A fourth driving device is furthermore provided at one support flange for rotating the tool holder relative to the support flanges, as is known from Published European Patent Application No. 0 061 078, corresponding to U.S. Pat. No. 4,460,920.

It is accordingly an object of the invention to provide a manipulator head with a machining tool for pipes or pipelines, which overcomes the hereinafore-mentioned disadvantages of the heretofore-known devices of this general type, and to do so in such a way that a finger milling cutter can be used as the tool. Such a tool is required, for instance, for working off defects in welding seams.

With the foregoing and other objects in view there is provided, in accordance with the invention, a manipulator head for the remotely controlled positioning and operation of a tool in the interior of a pipe or pipeline comprising:

first and second support flanges having outer surfaces, guiding elements for the rolling advancement of the manipulator head and radially movable, hydraulically operable clamping devices for locking the manipulator head in place;

a tool holder in the form of a tubular support frame having assembly or installation openings formed therein, an inner wall surface, and third and fourth support flanges with outwardly pointing ends adjacent end faces of the tool holder, the tool holder interconnecting the first and second support flanges and being rotatably supported by the first and second support flanges;

a rotating tool including a finger milling cutter disposed in the vicinity of one of the assembly openings for mechanically machining the inner wall surface of a pipe or pipeline, the finger milling cutter being disposed laterally of the axis of the manipulator head and coaxial to a radius of the manipulator head;

an axially extended first guide tail attached to the inner wall surface of the tool holder or support frame, a first slide axially movable on the first guide rail, a first driving device coupled to the first slide for axially moving the tool;

a second guide rail fastened to the first slide and extended parallel to a radius of the manipulator head, a second slide radially movable on the second guide rail, a second driving device coupled to the second slide for radially setting the tool;

the finger milling cutter being fastened to the second slide, a third driving device coupled to the finger milling cutter for performing a working motion of the tool; and a fourth driving device disposed at one of the first and second support flanges for rotating the tool holder relative to the first and second support flanges, the fourth driving device including a worm gear transmission having a worm gear or wheel fastened on the outer surface of the one of the first and second support flanges axially of the outwardly pointing end of one of the third and fourth support flanges, a worm engaging the worm gear, a step-down transmission or reduction gear connected to the worm, and a drive motor connected to the transmission, the worm, transmission and drive motor being transverse to the axis of the manipulator head, and pillow blocks extending over the worm gear supporting the drive motor and the step-down transmission.

Such a construction of the manipulator head can handle the large forces which occur during the operation of the finger milling cutter. Thus, the hydraulically operable clamping devices provide secure locking of the manipulator head in the pipe or in the pipeline during the working phase. The construction of the tool holder as a tubular frame provides a torsionally stiff frame structure. The guidance of the finger milling cutter with rails and slides can also take up large forces. The construction of the driving device for rotating the tubular frame also takes into consideration the forces which occur during the feeding of the finger milling cutter in the circumferential direction and is constructed as short and compact as possible, so as to take pipe elbows in the axial direction of the manipulator head into consideration.

In accordance with another feature of the invention, there is provided another finger milling cutter and another second driving device, each of the finger milling cutters being driven by a respective one of the second driving devices and each being fastened to the second slide symmetrically to the axis of the manipulator head. In this case, resetting times after one finger milling cutter or head is worn are reduced, i.e. a replacement milling cutter can be inserted without substantial interruption of the machining process.

In accordance with an additional feature of the invention, the driving devices for driving the finger milling cutter and for rotating the tool holder are hydraulic motors. This is done in consideration of the forces required for milling.

In accordance with an added feature of the invention, the first and second driving devices include respective first and second electric motors and respective first and second threaded spindle and travelling nut drives having first and second travelling nuts supported in the first and second slides, respectively.

In accordance with a concomitant feature of the invention, the guiding rails and the slides, respectively, engage each other in dove-tail fashion. This is done in order to control the guidance forces for moving the finger milling cutter.

Instead of or in addition to a finger milling cutter, two finger milling cutters can be disposed at the radially movable slide or one or two conventional test heads (eddy current test heads) may be provided for localizing and testing the location to be machined (for instance an incipient crack in a welded seam), after it is machined.

Other features which are considered as characteristic for the invention are set forth in the appended claims.

Although the invention is illustrated and described herein as embodied in a manipulator head with a machining tool for pipes or pipelines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
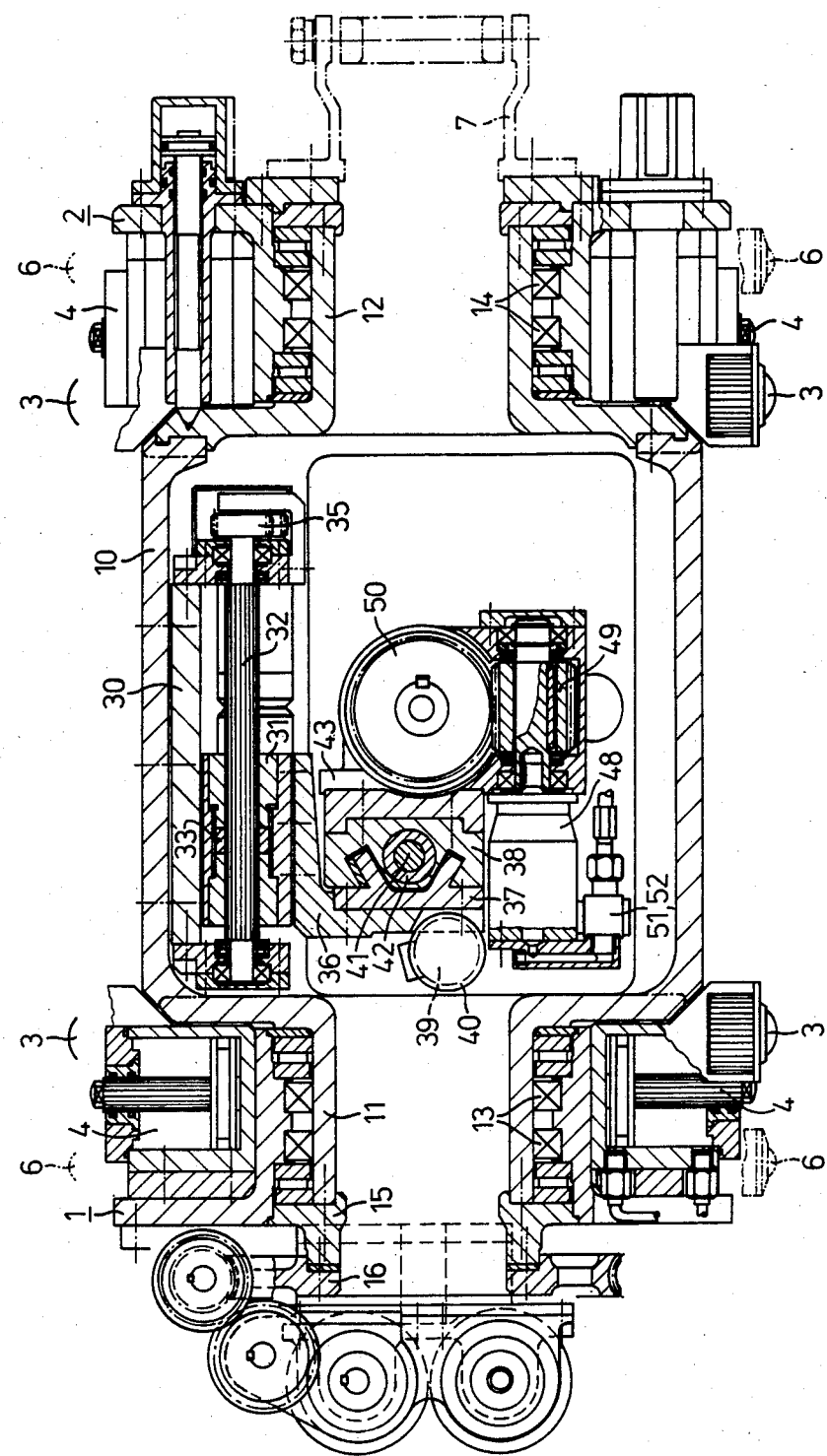
FIG. 1 is a fragmentary, diagrammatic, longitudinal-sectional view, partly broken away, of the overall structure of the manipulator head.

Referring now to figures of the drawing in detail and first, particularly, to FIG. 1 thereof, there is seen a manipulator head which is similar to the structure known from Published European Patent Application No. 0 061 078, corresponding to U.S. Pat. No. 4,460,920 and which is formed of the following essential subassemblies:

1. Support flanges 1 and 2 which are provided with guiding elements 3 for the rolling advance of a manipulator head, according to the conventional construction;

2. A tool holder in the form of a tubular frame 10 which rigidly interconnects the two support flanges 1 and 2 and is rotatably supported by means of axially adjacent support flanges 11 and 12 through bearings 13 and 14 in the support flanges; and 3. A machining tool proper in the form of milling heads 44 and 45 with finger milling cutters 46 and 47 shown in FIG. 6. In this case, the milling heads are axially supported and radially movable in the frame 10.

Connected to the support flange 2 is a coupling part 7, to which one manipulator vehicle, such as a stepping mechanism, can be coupled. Clamping devices 4 which are provided at the support flanges and can be moved out radially by pneumatic action, also belong to such a stepping mechanism.

Figure 2:
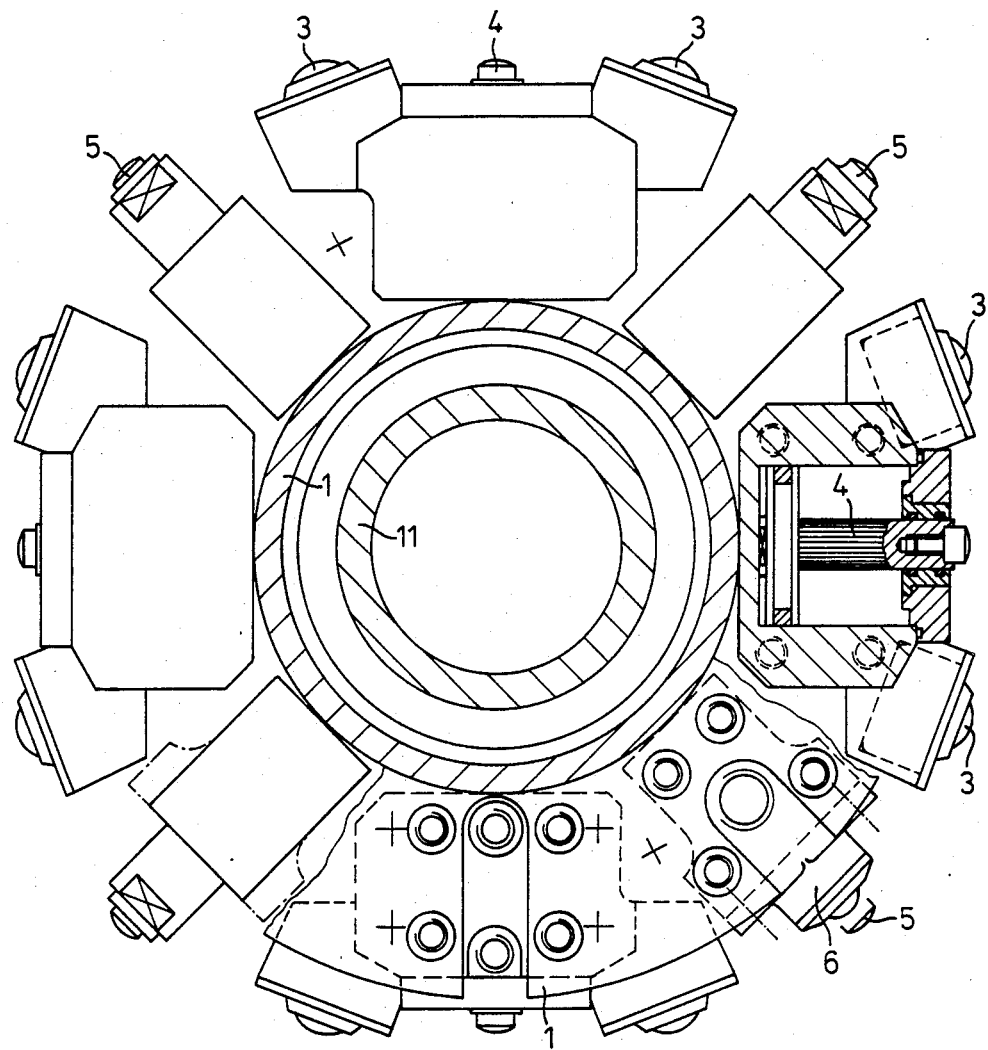
FIG. 2 is a partly sectional and partly broken-away front-elevational view of a support flange.

According to FIG. 2, further clamping devices 5 are provided between the guide elements 2 for the rolling advance of the manipulator head and the clamping devices 4, for locking the manipulator head in a pipe or a pipeline during the machining process. The further clamping devices 5 are formed of hydraulically operable clamping bolts. In the illustrated embodiment, four such clamping bolts are uniformly distributed at the periphery of the support flanges 1 and 2. With this configuration of pneumatically operable clamping devices which can be actuated hydraulically, it is necessary to axially offset the ring of guiding elements 3 relative to the ring of the clamping devices 4 and 5, as shown in FIG. 1. In order to assure that the manipulator head can negotiate curves in this relationship of guiding elements and clamping devices, a second ring of guiding elements 6 is provided on the other side of the ring of clamping devices. As seen in the circumferential direction, the guiding elements 6 are located on the same radii as the clamping devices 4 and 5, i.e. the ring of guiding elements 3 is also offset in the circumferential direction relative to the ring of guiding elements 6.

Figure 3:
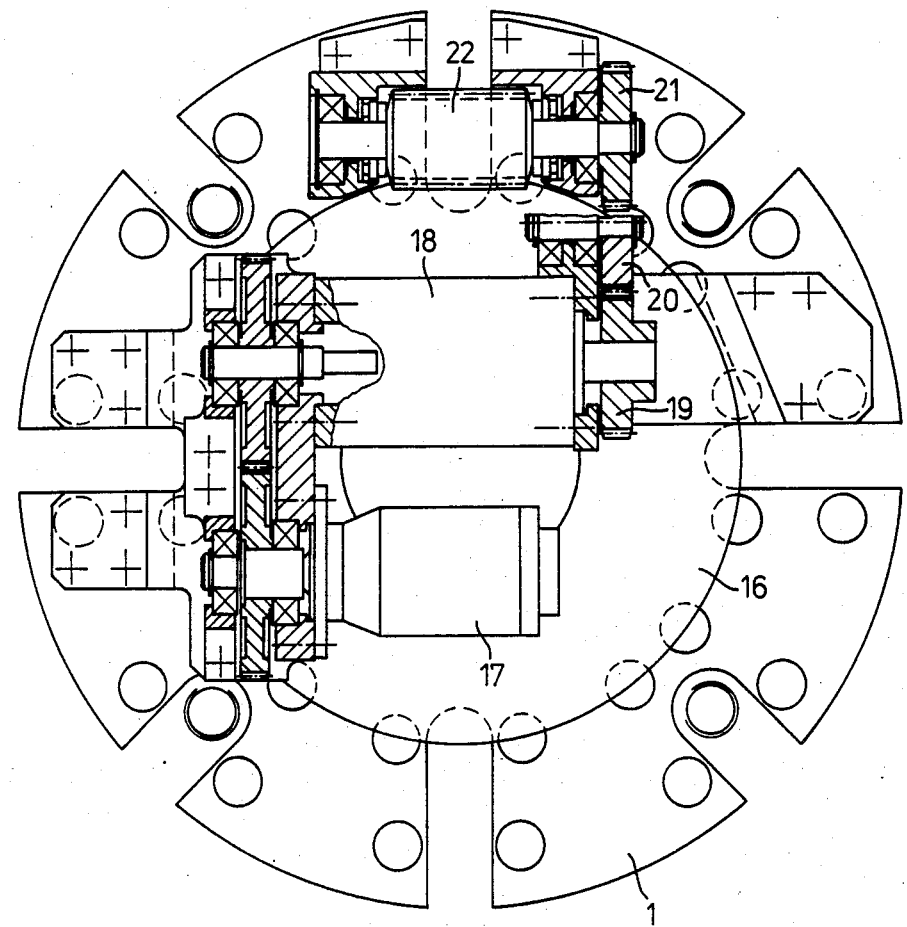
FIG. 3 is a view similar to FIG. 1 of a manipulator head on the support flange provided with a fourth driving device.
Figure 4:
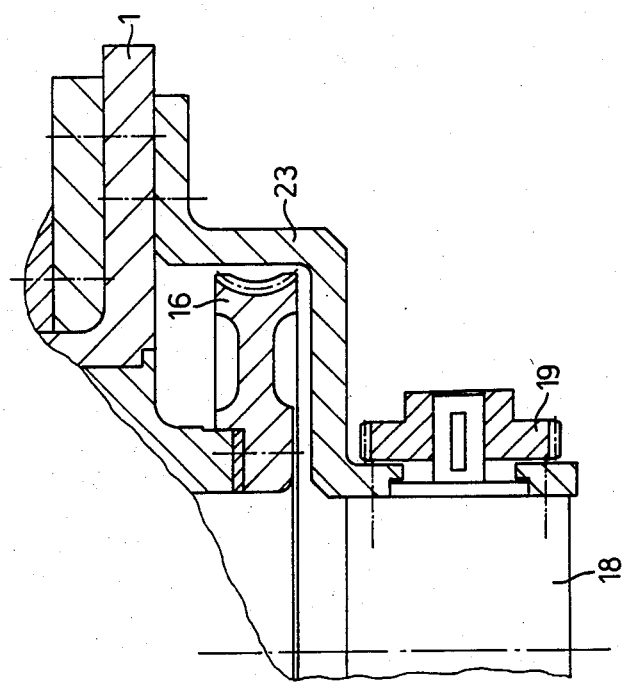
FIGS. 4 and 5 are fragmentary, sectional views of pillow blocks for the motor and the gear of the fourth driving device.
Figure 5:
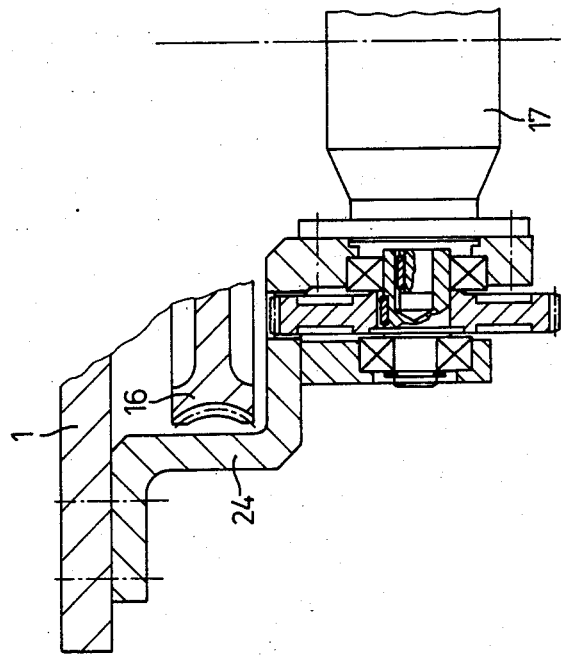

In order to rotate the rotatably supported tubular frame 10, a worm gear 16 is flanged to the outside of the support flange 1 at the outwardly-pointing end of the support flange 11, through an intermediate piece 15: the worm gear 16 is associated with a fourth driving device which is fastened to the support flange 1. According to FIG. 3, the driving device is formed of a hydraulic motor 17 followed by an encapsulated step-down transmission 18 and a gear drive formed of three gears 19, 20, 21 with a worm 22 associated with the gear 21. This worm is supported on the support flange 1 through appropriate pillow blocks. With respect to supporting the motor 17 and the stepdown drive 18, special pillow blocks 23 and 24 are provided according to FIGS. 4 and 5 which extend over the worm gear 16.

Figure 6:
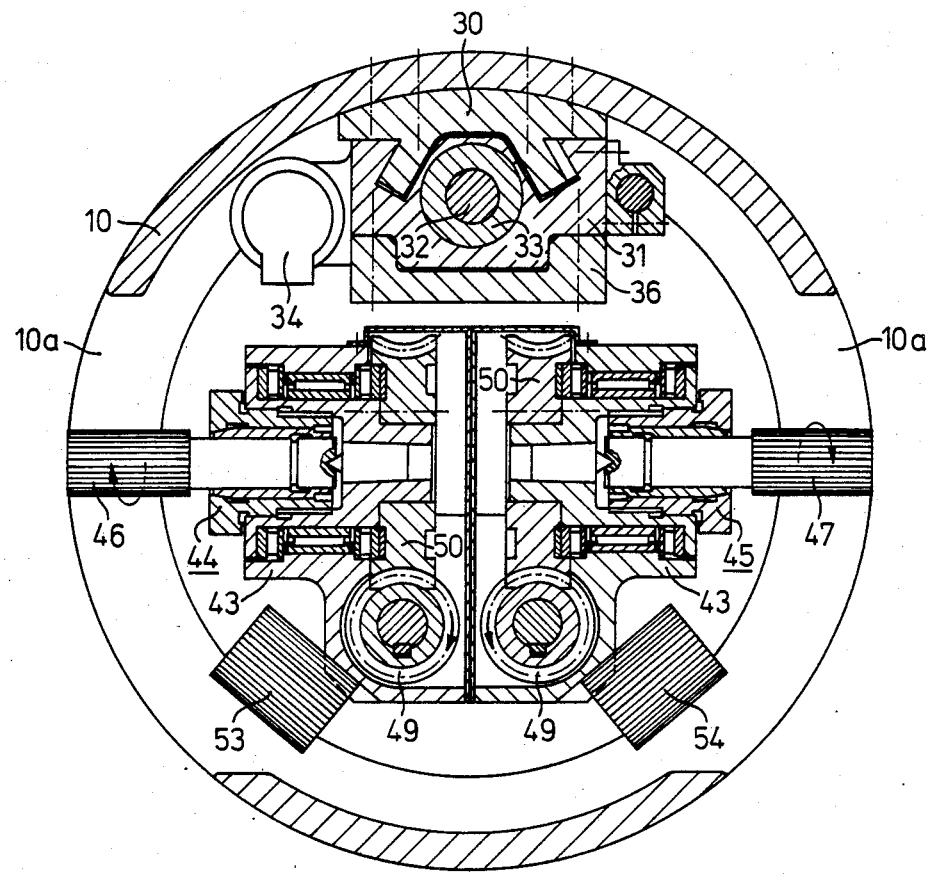
FIG. 6 is a cross-sectional view through an equipped tubular support frame.

According to FIGS. 1 and 6, a guide rail 30 for an axial slide 31 is disposed in the tubular support frame 10 which extends in the axial direction of the manipulator head. The guide rail and the axial slide engage each other in dove-tail fashion. The axial slide 31 is in engagement with a threaded spindle 32 through a travelling nut 33. The axial slide is driven through the nut 33 with the aid of a motor 34 disposed parallel to the threaded spindle, with an interposed transmission gear box 35.

A holder 36 for a second guide rail 37 is fastened to the axial slide 31. The guide rail 37 extends diagonally relative to the manipulator head or parallel to a diagonal of the manipulator head and thus perpendicular to the axis of the threaded spindle 32. The guide rail is associated with a radial slide 38. The guide rail and the radial slide are also engaged in dove-tail fashion. In this case as well, the radial slide 38 is driven by a threaded spindle 41 with a travelling nut 42. The associated motor is designated with reference numeral 39 and the corresponding transmission with reference numeral 40.

A tool plate 43 which supports the two milling heads 44 and 45 with the milling cutters or finger milling cutters 46 and 47, is fastened to the radial slide 38. Each milling head is associated with a drive motor 48 with a worm gear which is formed of a worm 49 and the worm wheel 50. The drive motors 48 are hydraulic motors, so that hydraulic connections 51 and 52 are provided. The support frame 10 also has two assembly openings 10a shown in FIG. 6, through which the movable slides with their drive devices and the milling cutter heads can be assembled and through which the finger milling cutters can be moved outward toward the wall of the pipe.

Television cameras 53 and 54 can be disposed adjacent the finger milling cutters 46 and 47, for monitoring the positioning of the respective finger milling cutter. Otherwise, the driving devices for turning the frame and for moving the slides may be equipped with motion pickups in order to perform the positioning of the milling tool accurately and reproducibly.

The foregoing is a description corresponding in substance to German Application No. P 35 10 288.8, dated Mar. 19, 1985, the International priority of which is being claimed for the instant application, and which is hereby made part of this application. Any material discrepancies between the foregoing specification and the aforementioned corresponding German application are to be resolved in favor of the latter.

We claim:

1. Manipulator head for the remotely controlled positioning and operation of a tool in the interior of a pipe or pipeline, comprising:

first and second support flanges having outer surfaces, guiding elements for the rolling advancement of the manipulator head and radially movable, hydraulically operable clamping devices for locking the manipulator head in place;

a tool holder in the form of a tubular support frame having assembly openings formed therein, an inner wall surface, and third and fourth support flanges with outwardly pointing ends adjacent end faces of said tool holder, said tool holder interconnecting said first and second support flanges and being rotatably supported by said first and second support flanges;

a rotating tool including a milling cutter disposed in the vicinity of one of said assembly openings for mechanically machining the inner wall surface of a pipe or pipeline, said milling cutter being disposed laterally of the axis of the manipulator head and coaxial to a radius of the manipulator head;

an axially extended first guide rail attached to said inner wall surface of said tool holder, a first slide axially movable on said first guide rail, a first driving device coupled to said first slide for axially moving said tool;

a second guide rail fastened to said first slide and extended parallel to a radius of the manipulator head, a second slide radially movable on said second guide rail, a second driving device coupled to said second slide for radially setting said tool;

said milling cutter being fastened to said second slide, a third driving device coupled to said milling cutter for performing a working motion of said tool; and a fourth driving device disposed at one of said first and second support flanges for rotating said tool holder relative to said first and second support flanges, said fourth driving device including a worm gear transmission having a worm gear fastened on said outer surface of said one of said first and second support flanges axially of said outwardly pointing end of one of said third and fourth support flanges, a worm engaging said worm gear, a step-down transmission connected to said worm, and a drive motor connected to said transmission, said worm, transmission and drive motor being transverse to the axis of the manipulator head, and pillow blocks extending over said worm gear supporting said drive motor and said step-down transmission.

2. Manipulator head according to claim 1, including at least one other milling cutter and at least one other second driving device, two of said milling cutters each being driven by a respective one of said second driving devices and each being fastened to said second slide symmetrically to the axis of the manipulator head.

3. Manipulator head according to claim 1, wherein said first and second driving devices include respective first and second electric motors and respective first and second threaded spindle and travelling nut drives having first and second travelling nuts supported in said first and second slides, respectively.

4. Manipulator head according to claim 1, wherein said driving devices for driving said milling cutter and for rotating said tool holder are hydraulic motors.

5. Manipulator head according to claim 1, wherein said guiding rails and said slides, respectively, engage each other in dove-tail fashion.

* * * * *